United States Patent
Ku et al.

(10) Patent No.: US 8,049,374 B2
(45) Date of Patent: Nov. 1, 2011

(54) MOVER ASSEMBLY OF RECIPROCATING MOTOR

(75) Inventors: Bon-Cheol Ku, Kimhae (KR);
Jin-Yoong Do, Changwon (KR);
Hyung-Pyo Yoon, Changwon (KR);
Si-Hang Jeon, Seo-Gu (KR);
Won-Hyuk Jung, Changwon (KR)

(73) Assignee: LG Electronics Inc., Seoul (KR)

( * ) Notice: Subject to any disclaimer, the term of this patent is extended or adjusted under 35 U.S.C. 154(b) by 928 days.

(21) Appl. No.: 11/157,792

(22) Filed: Jun. 22, 2005

(65) Prior Publication Data
US 2005/0235481 A1    Oct. 27, 2005

Related U.S. Application Data

(62) Division of application No. 10/296,044, filed as application No. PCT/KR01/00479 on Mar. 24, 2001, now Pat. No. 6,920,682.

(51) Int. Cl.
*H02K 33/00* (2006.01)

(52) U.S. Cl. .................. 310/15; 29/596; 310/156.28

(58) Field of Classification Search .............. 29/596, 29/598, 732; 310/156.22, 156.28, 156.38, 310/156.45, 254, 261, 15
See application file for complete search history.

(56) References Cited

U.S. PATENT DOCUMENTS

| | | | |
|---|---|---|---|
| 3,987,324 A * | 10/1976 | Linkous | 310/197 |
| 4,638,200 A | 1/1987 | Le Corre et al. | |
| 4,674,178 A * | 6/1987 | Patel | 29/598 |
| 4,827,163 A | 5/1989 | Bhate et al. | |
| 4,876,050 A * | 10/1989 | Horton | 264/102 |
| 5,345,669 A | 9/1994 | Zigler et al. | |
| 5,382,219 A * | 1/1995 | Malekmadani | 494/16 |
| 6,047,461 A * | 4/2000 | Miura et al. | 29/598 |
| 6,097,125 A | 8/2000 | Park et al. | |

(Continued)

FOREIGN PATENT DOCUMENTS

DE    41 11 411 B4    9/2006

(Continued)

OTHER PUBLICATIONS

"Circumference." Merriam-Webster Online Dictionary. 2010. Merriam-Webster Online. Jun. 14, 2010.<http://www.merriam-webster.com/dictionary/circumference>.*

*Primary Examiner* — Livius R Cazan

(74) *Attorney, Agent, or Firm* — Birch, Stewart, Kolasch & Birch, LLP

(57) ABSTRACT

A mover assembly of a reciprocating motor includes: a mover body disposed at a gap between an inner stator and an outer stator; permanent magnets fixed at an outer circumferential surface of the mover body and reciprocally moved together with the mover body in a direction of an induction magnetic field between the inner stator and the outer stator; and a mixed member made of a fiber and a resin to cover and fix the permanent magnets. The permanent magnets are arranged at an outer circumferential face of the mover body, covered with the mixed member obtained by mixing a fiber and a resin, and hardened to be fixed. Therefore, the permanent magnets can be firmly and easily fixed at the mover body. In addition, by molding the mover body with a non-magnetic and non-conductive material, leakage of the magnetic force of the permanent magnets can be prevented.

8 Claims, 6 Drawing Sheets

U.S. PATENT DOCUMENTS

| | | |
|---|---|---|
| 6,144,130 A | 11/2000 | Kawamura |
| 6,342,746 B1 * | 1/2002 | Flynn ............................ 310/181 |
| 6,653,753 B1 * | 11/2003 | Kawano et al. .................. 310/14 |

FOREIGN PATENT DOCUMENTS

| | | |
|---|---|---|
| EP | 0 854 558 A2 | 7/1998 |
| GB | 2 007 146-UA | 5/1979 |
| JP | 01-252156 A | 10/1989 |
| JP | 05-161338 A | 6/1993 |
| JP | 09-200985 A | 7/1997 |
| JP | 10-136619 A | 5/1998 |
| JP | 10-323003 A | 12/1998 |
| JP | 2000-134840 A | 5/2000 |
| JP | 2001-57767 A | 2/2001 |
| WO | WO 97/043814 A1 | 11/1997 |
| WO | WO 0014858 A1 * | 3/2000 |
| WO | WO 0062406 A1 * | 10/2000 |

* cited by examiner

MOVER ASSEMBLY OF RECIPROCATING MOTOR

This application is a Divisional of Application No. 10/296,044, filed on Nov. 21, 2002, now U.S. Pat. No. 6,920,682, issued Jul. 26, 2005, which is the national phase under 35 USC §371 of International PCT Application No. PCT/KR01/00479 which has an international filing date of Mar. 24, 2001, which designated the United States of America, and for which priority is claimed under 35 U.S.C. §120; and the entire contents of all are hereby incorporated by reference.

TECHNICAL FIELD

The present invention relates a mover assembly of a reciprocating motor and its fabrication method, and more particularly, to a mover of a reciprocating motor that is capable of firmly and easily fixing permanent magnets, and its fabrication method.

BACKGROUND ART

In general, a reciprocating motor is formed by modifying an induction magnetic field of a motor with a cubic structure to a flat shape, so that a flat shaped mover is mounted at an upper side of a stator formed flat and moved linearly according to a magnetic field change.

Recently, a reciprocating motor has been introduced that a stator is separated into an outer stator and an inner stator formed in a cylindrical shape which are arranged overlapped with a certain gap therebetween, a mover assembly is movably disposed between the outer stator and the inner stator, a winding coil is mounted at either one of the outer stator and the inner stator, and permanent magnets are attached at the corresponding mover assembly, so that the mover can be reciprocally moved in an axial direction of the reciprocating motor by an induction magnetic field generated by the winding coil.

As shown in FIG. 1, a conventional reciprocating motor includes: a stator 10 forming an induction magnetic field, and a mover assembly 20 reciprocally moved according to the induction magnetic field of the stator 10.

The stator 10 includes an outer stator 11 formed in a hollow cylindrical shape as a plurality of laminations are stacked and having a winding coil (C) therein, and an inner stator 12 formed in a hollow cylindrical shape as a plurality of iron pieces are stacked and inserted into the outer stator 11 with a certain gap therebetween.

The mover assembly 20 includes a mover body 21 formed in a cylindrical shape and disposed movably between the outer stator 11 and the inner stator 12, permanent magnets 22 mounted at equal intervals at an outer circumference surface of the mover body 21 corresponding to the winding coil (C) of the stator 10, and a magnet cover 23 formed in a cylindrical shape to cover the permanent magnets 22, and forcibly press-fit, bent or welded to the outer circumferential surface of the permanent magnets 22.

Reference numeral 21a is a permanent magnet mounting groove.

The operation of the conventional reciprocating motor for a compressor will now be described.

When a current is applied to the winding coil (C), an induction magnetic field is formed in different directions between the outer stator 11 and the inner stator 12 according to the direction of the current. The mover body 21 is reciprocally moved together with the permanent magnets 22 as they are drawn or pushed according to the direction of the induction magnetic field.

If a piston (not shown) is coupled at the mover body 21, the piston is reciprocally moved in a cylinder (not shown) together with the mover assembly 20, thereby compressing a fluid.

However, in the conventional reciprocating motor, as shown in FIG. 2, the permanent magnet cover 23 is formed in a cylindrical shape, but in case of the permanent magnets (M), there occurs a height difference (h) due to a processing error of each permanent magnet (M). Thus, causing a difficulty in the press-fit operation, and the permanent magnets 22 may be broken if they are forcibly press-fit or released from the mover body.

In order to solve the problem, the permanent magnet cover 23 may be press-fit and then fixed by a spot welding. In this respect, however, since the permanent magnet cover 23 is made of a thin plate material, there is a difficulty in the welding operation, and even if the welding is performed, its strength is weak, resulting in that the permanent magnet cover may be released.

In addition, for welding, the mover body 21 is limited to the metallic material, and if the metallic material is used, a magnetic force is leaked to degrade an efficiency of the motor.

TECHNICAL GIST OF THE PRESENT INVENTION

Therefore, an object of the present invention is to provide an improved mover assembly of a reciprocating motor which is capable of easily and firmly fixing the permanent magnets to a cylindrical mover body, and its fabrication method.

Another object of the present invention is to provide a mover assembly of a reciprocating motor of which a mover body can be fabricated with a non-magnetic material and non-conductive material in order to prevent leakage of magnetic force of a permanent magnet.

DETAILED DESCRIPTION OF THE INVENTION

In order to achieve the above objects, there is provided a mover assembly of a reciprocating motor including: a mover body disposed at a gap between an inner stator and an outer stator; permanent magnets fixed at an outer circumferential surface of the mover body and reciprocally moved together with the mover body in a direction of an induction magnetic field between the inner stator and the outer stator; and a mixed member made of a fiber and a resin to cover and fix the permanent magnets.

To achieve the above objects, there is also provided a method for fabricating a mover assembly of a reciprocating motor including the steps of: arranging permanent magnets at equal intervals at an outer circumferential surface of a mover body; covering the permanent magnets with a mixed member in a shape of a sheet or a wire made of a fiber and a resin; and firmly attaching the permanent magnets by the mixed member through plastic-working and hardening.

MODE FOR CARRYING OUT THE PREFERRED EMBODIMENTS

The present invention will now be described with reference to accompanying drawings.

Figure 1:
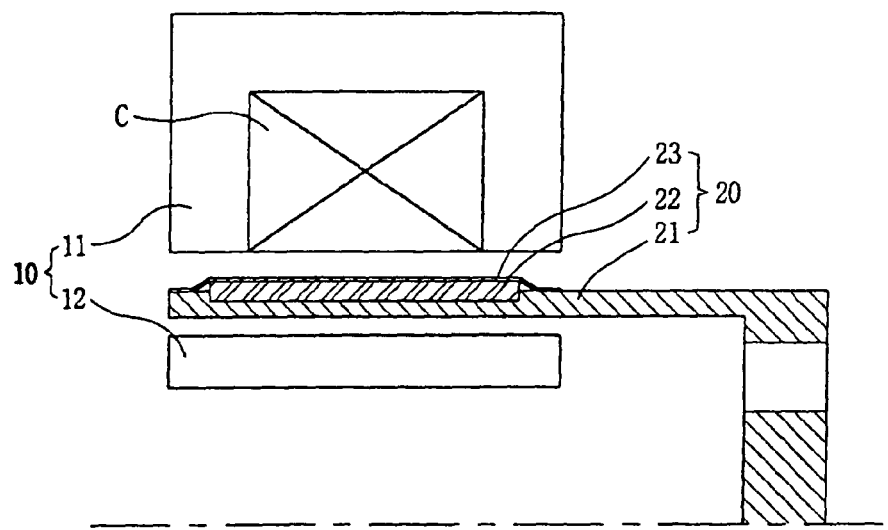
FIG. 1 is a semi-sectional view showing a reciprocating motor viewed from the side in accordance with a conventional art.
Figure 2:
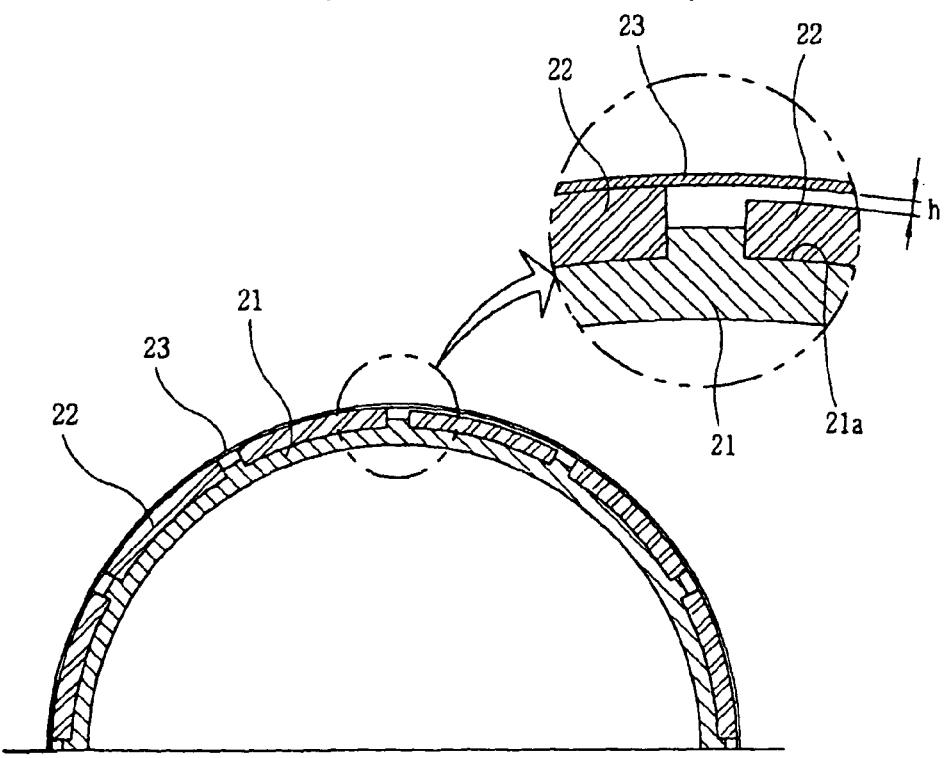
FIG. 2 is a semi-sectional view showing a mover assembly viewed from the front side in accordance with the conventional art.
Figure 3:
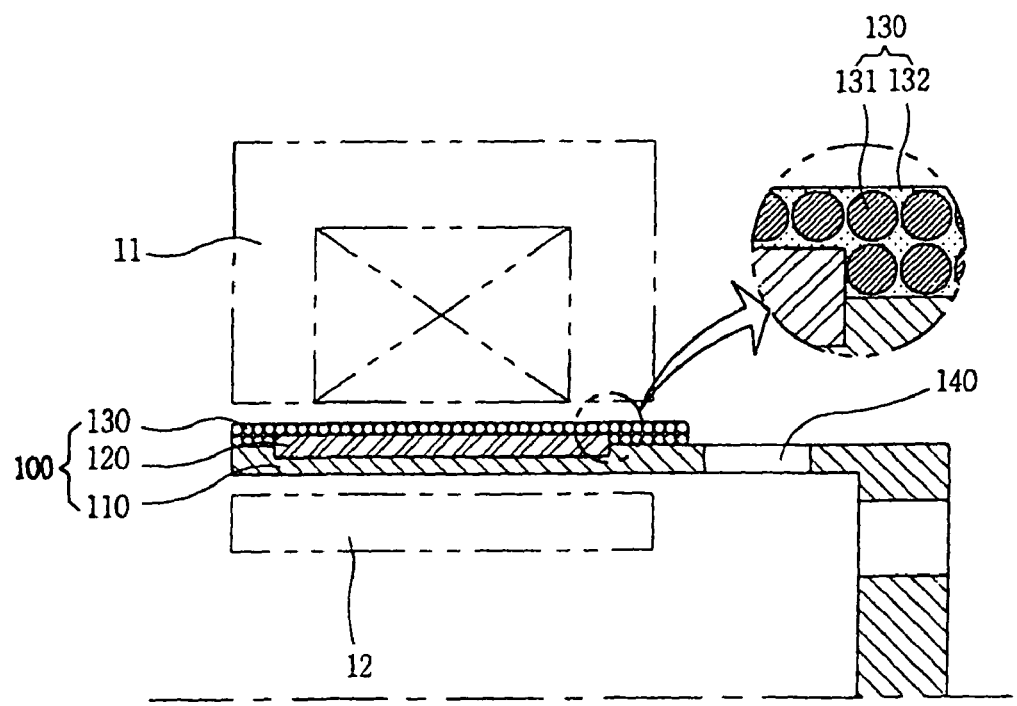
FIG. 3 is a semi-sectional view showing a reciprocating motor viewed from the side in accordance with the present invention.

As shown in FIG. 3, a mover assembly 100 of a reciprocating motor of the present invention includes: a mover body 110 formed in a cylindrical shape and disposed movable between an outer stator (11) and an inner stator 12; permanent magnets 120 mounted at an outer circumferential surface of the mover body 110 at equal intervals corresponding to a winding coil (C) of the outer stator 11; and a mixed member 130 for covering and fixing the permanent magnets 120.

Figure 4:
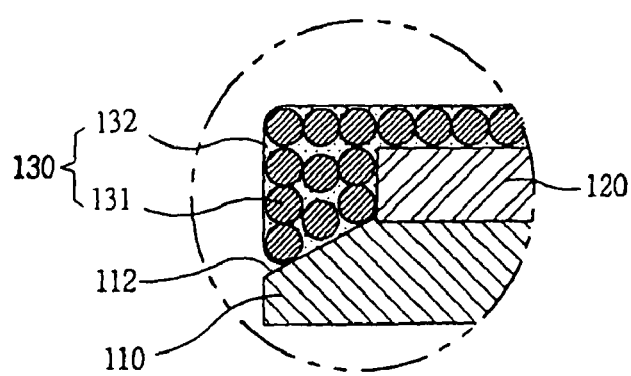
FIG. 4 is a semi-sectional view showing a mover assembly viewed from the front side in accordance with the present invention.
Figure 5:
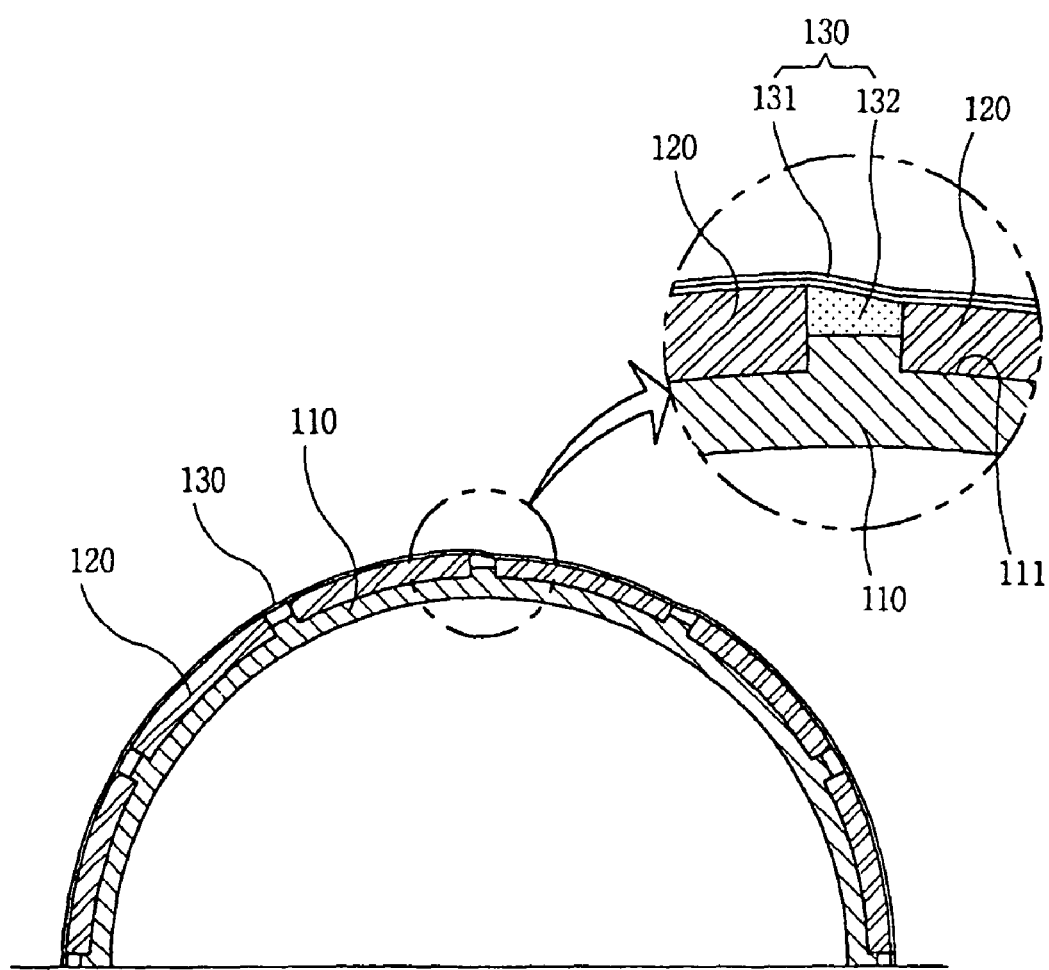
FIG. 5 is a detailed view showing a modification of the mover assembly in accordance with the present invention.

As shown in FIG. 4, preferably, the mover body 110 includes a slope side 112, at the outer circumferential surface, gradually lowered as it goes away from the permanent magnet 120 in consideration of the strength of the mixed member 130 when projected from the side or from the front side, and a hole 140 is formed to reduce a fluid resistance when the mover body 110 is reciprocally moved.

In consideration of magnetic leakage, the mover body 110 is preferably molded by a non-magnetic metal or more preferably molded by a non-magnetic and non-conductive plastic material.

Especially, in case of the plastic material, carbon fiber or glass fiber is mixed as a reinforcing material with the plastic material for molding.

The permanent magnets 120 may be formed with a circular arc-shaped section by having the same length of the inner circumferential face and the outer circumferential face when projected from the front side so as to correspond to the outer circumferential face of the mover body 110. According to circumferences, a permanent magnet mounting groove 111 can be formed flat so that the permanent magnets 120 are formed in a rectangular shape.

Between the permanent magnets 120, a resin 132 of the mixed member 130 is infiltrated to fill the space between the permanent magnets 120.

The mixed member 130 is formed as a fiber 131 such as a carbon fiber, a glass fiber or a cablor fiber and the resin 132 such as epoxy and polyester or penol are mixed and formed in a sheet or a wire shape.

A plurality of fibers 131 are arranged side by side in only one direction with a certain width, or may be plaited in a 'cross stripes' shape or a 'grid' shape to double the pressing force.

The mixed member 130 has a circumferential directional texture 130a on the circumferential surface to contain a certain roughness or at least one parting line according to its hardening method.

Figure 6:
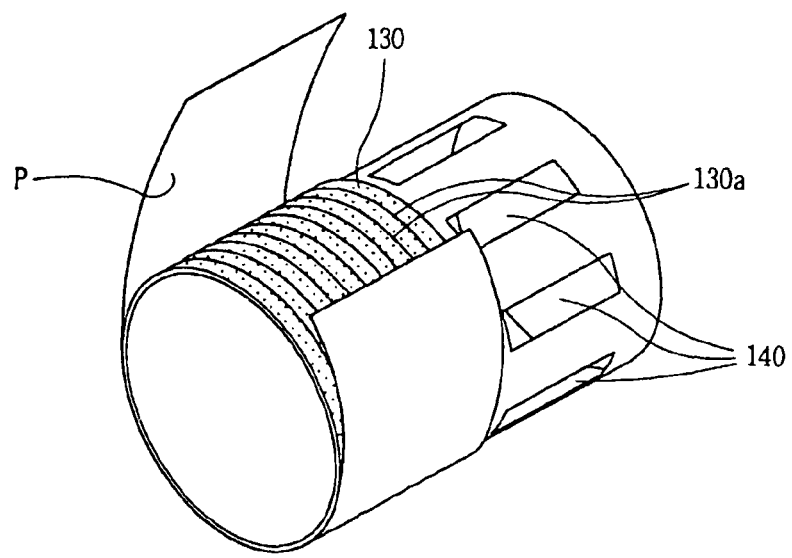
FIG. 6 is a perspective view showing one process for maintaining a form of a mixed member when the mixed member is hardened in the mover assembly in accordance with the present invention.
Figure 7:
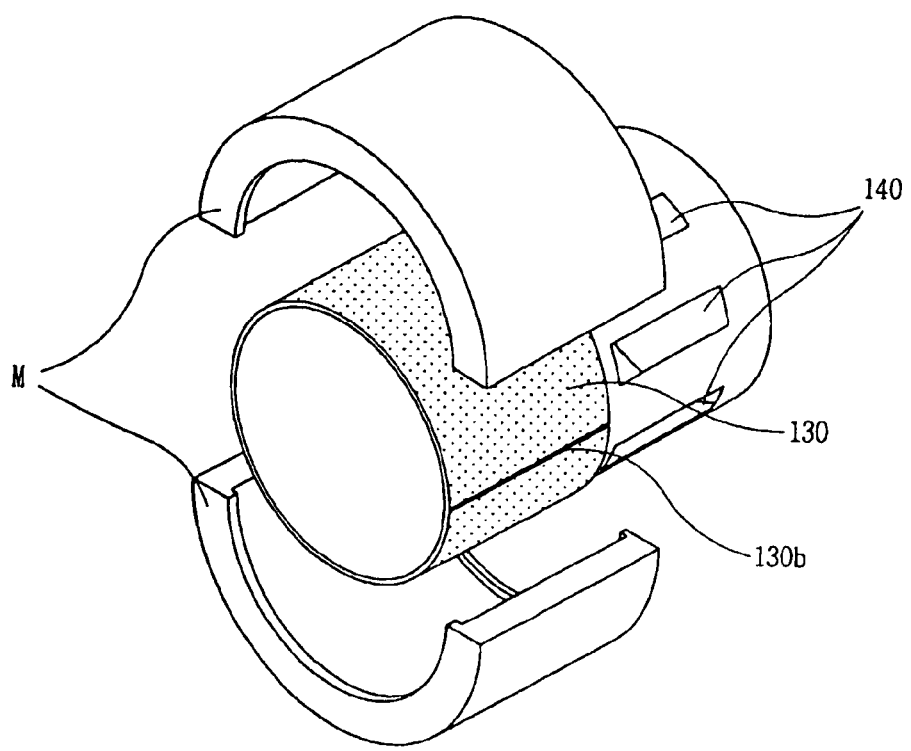
FIG. 7 is a perspective view showing another process for maintaining a form of a mixed member when the mixed member is hardened in the mover assembly in accordance with the present invention.

That is, as shown in FIG. 6, in case that the mixed member 130 is hardened by winding with a pressing film (P), the texture 130a is generated, and as shown in FIG. 7, in case that the mixed member 130 is hardened by covering a mold (M) thereon, the parting line 130b is created.

In the aspect of the strength, it is preferred that the mixed member 130 is formed around up to hole 140 provided at the side of the mover body 110.

The process for fabricating the mover assembly of a reciprocating motor will now be described with reference to FIGS. 8, 9 and 10.

First, in case that the mover body 110 is made of a metal material, it is thermally treated at a certain temperature in order to remove the magnetism. Meanwhile, in case that the mover body 110 is made of a resin, a non-metal material, a reinforcing material such as a carbon fiber or a glass fiber is added to the resin and roughly molded, the portion where the permanent magnet 120 is to be mounted is ground by post-processing, and then the permanent magnets 120 are arranged at the outer circumference of the mover body 110 at equal intervals.

At this time, the outer circumferential face of the mover body 110 includes a slope face 112 which is lowered down in its height as it is distanced from the permanent magnet mounting groove 111 so that when the mixed member 130 becomes thick, the strength of the mixed member 130 is intensified, thereby more firmly fixing the permanent magnets 120.

Next, the sheet or wire-shaped fiber 131 is induced into a resin receptacle 150 filled with the resin 132, in which the fiber 131 and the resin 132 are mixed to fabricate the mixed member 130, which is induced to a position where it winds the mover body 110 to thereby cover the permanent magnets 120.

Referring to the formation of the mixed member 130, a receptacle be used in a so-called 'dry technique' that the fiber 131 and the resin 132 are mixed in advance, which covers the permanent magnets 120 in a bit dried state (a pre-preg state), or a so-called 'wet technique' that the fiber 131 is infiltrated into the resin 132 just before covering the permanent magnets 120.

Figure 8:
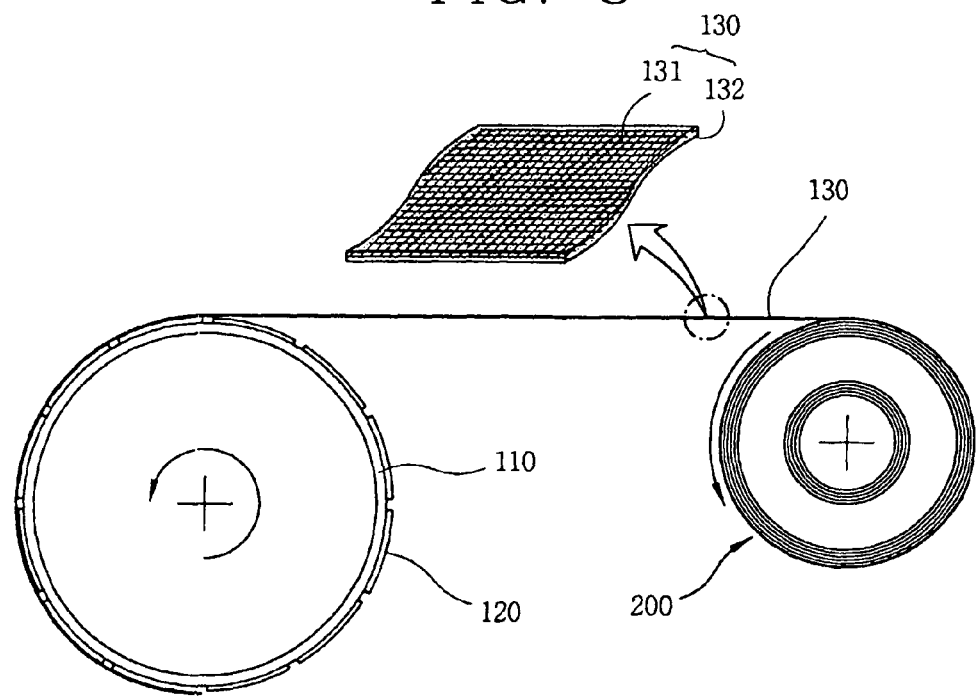
FIG. 8 is a schematic view showing one process for winding the mixed member in the mover assembly in accordance with the present invention.

As shown in FIG. 8, specifically, the 'dry technique' is that the mover body 110 with the permanent magnets 120 attached thereto is fixed at a rotor (not shown) and a mixed member roll 200 with the mixed member 130 wound thereon is disposed at the opposite side so that the mixed member 130 covers the permanent magnets 120 in the pre-preg state while rotating the mover body 110.

Figure 9:
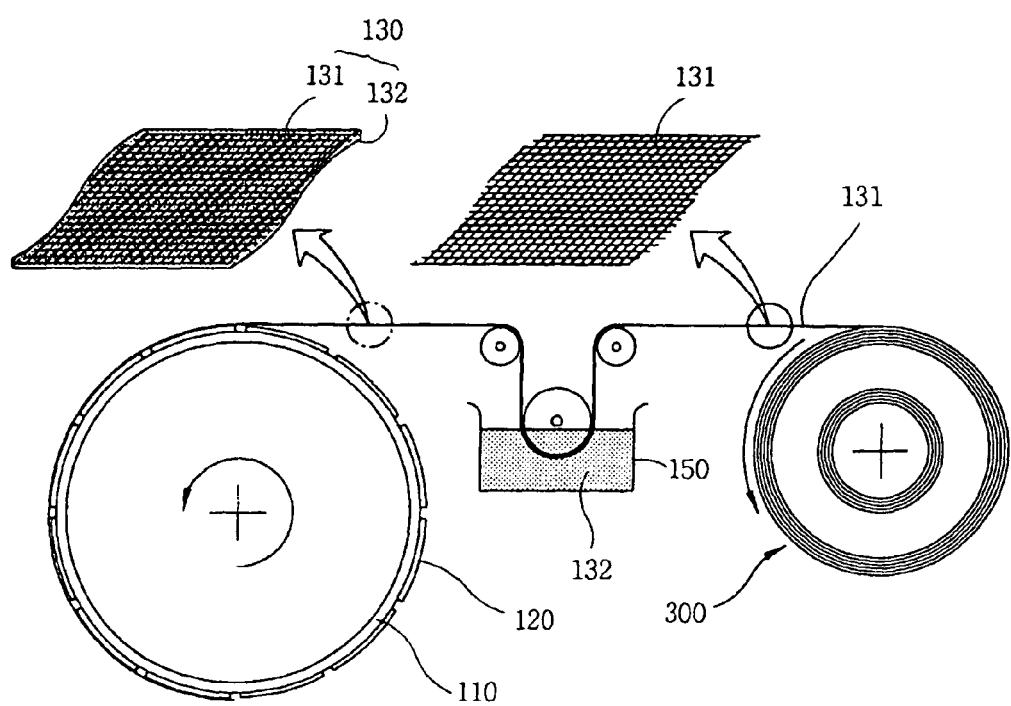
FIG. 9 is a schematic view showing another process for winding the mixed member in the mover assembly in accordance with the present invention.
Figure 10:
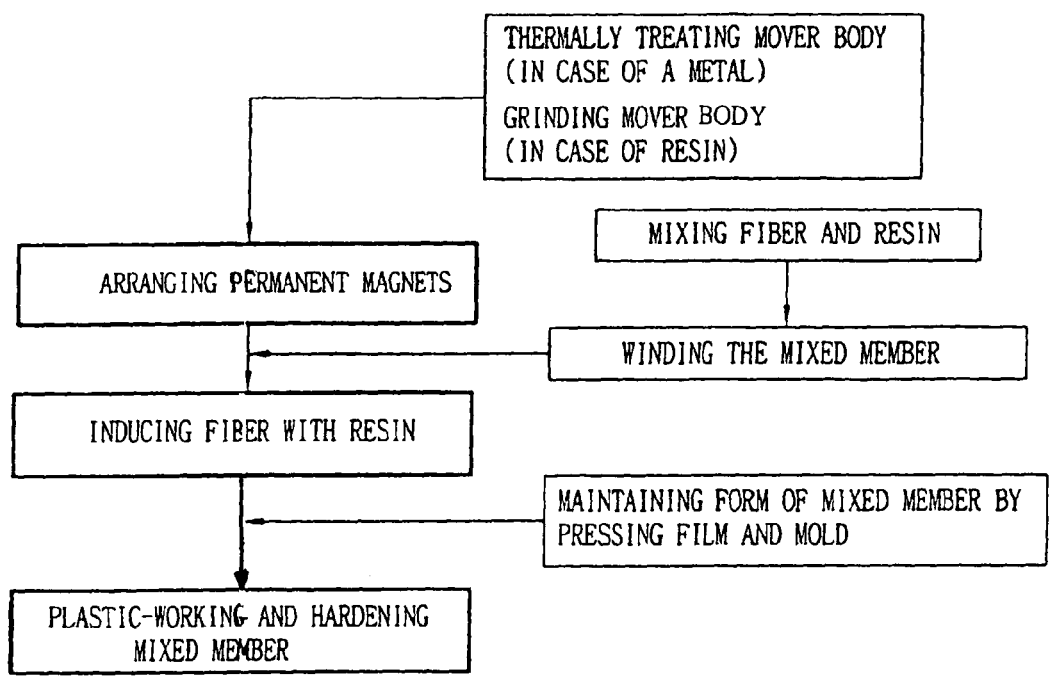
FIG. 10 is a flow chart showing a process of fabricating the mover assembly in accordance with the present invention.

As shown in FIG. 9, the 'wet-technique' is that the mover body 110 with the permanent magnets 120 attached thereon is fixed at a rotor (not shown), a fiber roll 300 with fiber wound thereon is disposed at the opposite side, a resin receptacle 150 filled with resin 132 is disposed between the mover body 110, and the fiber roll 300, the fiber 131 is first infiltrated into the resin 132 so as to be mixed and then covers the permanent magnets 120 of the mover body 110.

Finally, in a state that the mixed member 130 is covered with the pressing film (P) to maintain its form so that the mixed member 130 can be maintained in a certain form, it is plastic-worked and hardened by a hardening means such as a hot blast, or in a state that the mixed member 130 is inserted in a mold of a certain shape made of silicon to maintain its form, and the mixed member 130 is plastic-worked and hardened by hot blast, so that the mixed member 130 firmly fixes the permanent magnets 120.

If the form of the mixed member 130 is maintained by using the pressing film (P), the texture 130a remains in a circular arc direction to have a certain roughness after the pressing film (P) is removed. If the metal mold (M) is used, the parting line 130b is left at a junction portion of the upper mold and the lower mold In this manner, the permanent magnets are fixed by using the mixed member obtained by mixing the fiber and the resin and the mixed member is hardened so that the permanent magnets are attached to the mover body. Accordingly, even if the permanent magnets are mounted unevenly due to a processing error, since the mixed member is uniformly pressed at the outer circumferential face of each permanent magnet before being hardened. Thus, the permanent magnets can be firmly and easily attached.

In addition, since the member for fixing the permanent magnets is made of the resin or the like, the mover body can be also made of a non-magnetic and non-conductive resin. Thus, leakage of a magnetic force can be prevented to improve an efficiency of the motor.

INDUSTRIAL APPLICABILITY

As so far described, according to the mover assembly of a reciprocating motor and its fabrication method, the permanent magnets are arranged at an outer circumferential face of the mover body, covered with the mixed member obtained by mixing a fiber and a resin, and hardened to be fixed. Therefore, the permanent magnets can be firmly and easily fixed at the mover body. In addition, by molding the mover body with a non-magnetic and non-conductive material, leakage of the magnetic force of the permanent magnets can be prevented.

The invention claimed is:

1. A mover assembly of a motor comprising:
   a hollow mover body having a circular curved wall with a particular thickness, the outer surface of the circular curved wall being treated to allow subsequent processing, the mover body having a first section to receive magnets and a second section with a plurality of elongated openings formed on and around the outer surface of the circular wall, each opening formed along a lengthwise direction of the mover body, the openings serving to reduce fluid resistance when the mover body reciprocates;
   a plurality of magnets at equally-spaced locations on the first section of the outer surface of the mover body with corresponding spaces formed between adjacent magnets, each magnet having an upper surface, a lower surface in contact with the first section of the mover body, and side surfaces connecting the upper surface to the lower surface, wherein a portion of each of the side surfaces protrudes from the circular curved wall of the mover body when the magnets are received in the first section of the mover body; and
   a pliable sheet of fiber-induced resin covering the first section having the plurality of magnets to secure the magnets onto the mover body,
   wherein the fiber-induced resin of the pliable sheet fills the spaces between adjacent magnets as a result of the pliable sheet being pressed onto the first section of the mover body, and
   wherein the mover body, the magnets, and the pliable sheet of fiber-induced resin are part of a reciprocating motor.

2. The assembly of claim 1, wherein the inner surface of the circular curved wall defines a space within the mover body to receive an inner stator of the reciprocating motor.

3. The assembly of claim 1, wherein the magnets cooperate with coil windings at an outer stator of the reciprocating motor to cause the mover body to reciprocate.

4. An apparatus comprising:
   a hollow cylindrical body having a central axis that is co-extensive with a shaft axis of a reciprocating motor, the cylindrical body having an opened end, a closed end, and a cylindrical wall having a particular thickness, the cylindrical wall having a first circular rim forming the opened end and a second circular rim forming a circular edge of the closed end, and the cylindrical body having a first section near the opened end and a second section near the closed end;
   a plurality of magnets protruding from the curved outer surface at the first section of the cylindrical body, each magnet placed into a respective groove formed along and around the cylindrical wall; and
   a pliable sheet of fiber-induced resin covering the entire first section of the cylindrical body such that the magnets are secured to the cylindrical body,
   wherein an upper surface and protruding portions of side surfaces of all magnets are covered by the fiber induced resin, and
   wherein the cylindrical body, the magnets, and the pliable sheet form a mover assembly of the reciprocating motor, the mover assembly cooperating with a stator assembly having an inner stator and an outer stator with a gap therebetween that operatively receives the first section of the cylindrical body such that that magnets at the first section and a winding coil at the outer stator affect each other to cause the mover assembly to reciprocate with respect to the stator assembly.

5. The apparatus of claim 4, wherein the second section includes a plurality of elongated openings formed on and around the curved outer surface, each opening formed along a lengthwise direction of the hollow cylindrical body, the openings serving to reduce fluid resistance when the mover assembly reciprocates.

6. The apparatus of claim 4, wherein the fiber-induced resin of the pliable sheet fills the spaces between adjacent magnets as a result of the pliable sheet being pressed onto the first section of the mover body.

7. The apparatus of claim 4, wherein the first circular rim is tapered towards the central axis of the mover body, and the pliable sheet of fiber-induced resin covers the first circular rim.

8. The apparatus of claim 4, wherein the first section of the cylindrical body reciprocates in the gap between the inner stator and the outer stator.

* * * * *